Patented Apr. 29, 1924.

1,492,155

UNITED STATES PATENT OFFICE.

ARTHUR L. BROWN, OF WILKINSBURG, PENNSYLVANIA, ASSIGNOR TO WESTINGHOUSE ELECTRIC & MANUFACTURING COMPANY, A CORPORATION OF PENNSYLVANIA.

INSULATING MATERIAL AND METHOD OF FORMING SAME.

No Drawing. Application filed August 26, 1919. Serial No. 319,968.

*To all whom it may concern:*

Be it known that I, ARTHUR L. BROWN, a citizen of the United States, and a resident of Wilkinsburg, in the county of Allegheny and State of Pennsylvania, have invented a new and useful Improvement in Insulating Materials and Methods of Forming Same, of which the following is a specification.

My invention relates to a cloth-insulating composition and to cloth and equivalent materials treated therewith, and it has, for its primary object, the provision of a composition for this purpose which shall be extremely durable and water-proof.

Heretofore, to the best of my knowledge, cloth-insulating compositions, such as the various varnishes and the like, have always contained some drier. As a result, these compositions have been difficult to handle in the ordinary impregnating machines, as the driers caused them to gum badly in the impregnating tanks and on whatever rolls are exposed to them. I have found that it is possible to produce a highly satisfactory insulating composition which does not employ any drier and which, therefore, is not open to the foregoing objections.

Furthermore, my composition does not employ any varnish gums so that no special or elaborate varnish equipment is needed in its preparation.

My cloth-insulating composition may be composed solely of China-wood oil and paracumarone, with or without a suitable solvent, such as benzine. The relative proportions of the China-wood oil and paracumarone employed may vary considerably, as the composition may contain from 65% to 90% China-wood oil and from 35% to 10% paracumarone, according to the characteristics desired. I have found, however, that a composition comprising substantially 80% China-wood oil and 20% paracumarone is very satisfactory. Obviously, the amount of solvent employed, if any, will vary according to the density of solution desired.

In practising my invention, I may heat a suitable amount of China-wood oil to approximately 200° C. after which I may add the proper amount of paracumarone which will preferably be a high-melting-point paracumarone. This mixture may then be cooked, for a suitable length of time, at a temperature between 200° C. and 250° C.

Care should be taken that the cooking is not too prolonged, as, otherwise, the mixture will turn to a jelly and be worthless for the purposes intended. I have found that, if the liquid threads finely when dropping from a stirrer, the cooking is complete.

After the composition has been prepared it may be employed in treating cloth and other materials for insulating purposes in the usual manner, with or without a solvent. The composition will dry when exposed to the air, and, when air-dried, will form an opaque coating or impregnation upon the material treated with it. I have found, however, that, if the treated material is artificially dried, as by baking it, the composition will be transparent and bright, so that I prefer, in all instances, to bake materials treated with it. By varying the length of time of baking, it may be possible to obtain either a dry or a tacky cloth, as desired.

Muslin or equivalent sheet material impregnated with my insulating composition provides an extremely durable and water-proof insulating material and one which is particularly well suited for use in the electrical arts. As the composition does not contain any driers or varnish gums, it may be easily and cheaply prepared and conveniently handled by means of impregnating machines now in use.

Obviously, various proportions of the ingredients may be employed, and the temperatures stated may be varied to suit different circumstances. For these reasons, no limitations are to be imposed upon my invention other than those indicated in the claims.

I claim as my invention:

1. An insulating material comprising fibrous sheet material impregnated with a baked insulating composition consisting solely of China-wood oil and a paracumarone.

2. An insulating material comprising cloth impregnated with a baked impregnating agent consisting solely of substantially 80% China-wood oil and 20% paracumarone.

3. The method of forming an insulating material which comprises impregnating fibrous material with a composition of China-wood oil and paracumarone and baking the same.

In testimony whereof, I have hereunto subscribed my name, this 31st day of July, 1919.

ARTHUR L. BROWN.